H. G. DAYTON.
MODE OF HEATING STILLS.

No. 44,711. Patented Oct. 18, 1864.

Witnesses:
Henry Bloom
C. L. Topliff

Inventor:
H. G. Dayton
per Munn & Co.
Attorneys

UNITED STATES PATENT OFFICE.

H. G. DAYTON, OF MAYSVILLE, KENTUCKY.

IMPROVED MODE OF HEATING STILLS.

Specification forming part of Letters Patent No. 44,711, dated October 18, 1864.

*To all whom it may concern:*

Be it known that I, H. G. DAYTON, of Maysville, in the county of Mason and State of Kentucky, have invented a new and Improved Heater; and I do hereby declare that the following is a full, clear, and exact description thereof, which will enable those skilled in the art to make and use the same, reference being had to the accompanying drawings, forming part of this specification, in which—

Figure 1:
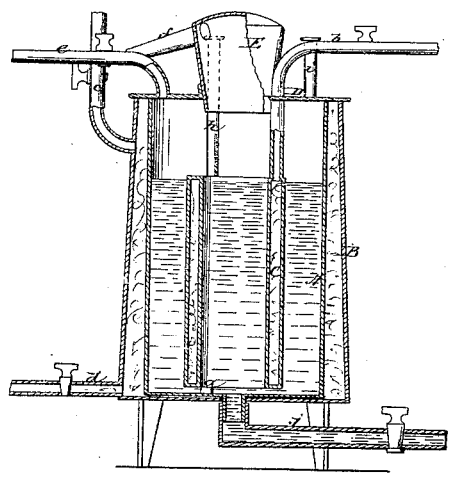
Figure 2:
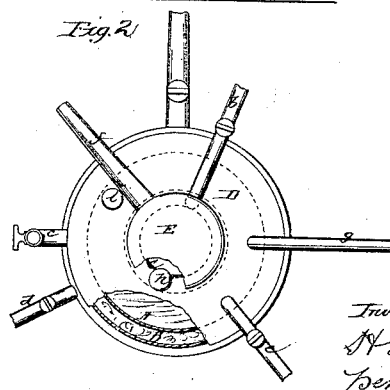

Figure 1 represents a vertical central section of this invention. Fig. 2 is a plan or top view of the same, partly in section.

Similar letters of reference indicate corresponding parts.

This invention relates particularly to an improvement in apparatus for heating mash in distilleries; and the invention consists in an annular cylinder which communicates with a steam or hot-air pipe, and which is situated in the center of a still surrounded by a steam-jacket, in combination with a series of pipes, in such a manner that when the still is charged with mash and steam is admitted to the steam-jacket and to the annular cylinder the mash is quickly heated with a comparatively small expenditure of steam, and the surplus steam, the condensed water, the low-wine, and the slop can all be discharged through appropriate channels without trouble or loss of time.

A represents a still, made of sheet metal or any other suitable material, which, however, ought to be a good conductor of heat. This still is surrounded by a steam-jacket, B, and its center is occupied by an annular cylinder, C, as clearly shown in Fig. 1 of the drawings. A cover, D, closes the top of the still and of the steam-jacket, and suitable pipes serve to charge the still and to conduct steam to the steam-jacket and to the annular cylinder. The diameter of this annular cylinder is smaller than the inner diameter of the still, and it does not extend close down to the bottom of the same. One or more pipes, $a$, extend from the bottom of the annular cylinder through the bottom of the still and form the communication between the interior of said cylinder and the steam-jacket. A pipe, $b$, which passes through the cover D into the top of the annular cylinder, conducts steam to the same and to the steam-jacket B, and the surplus steam is allowed to escape through a pipe, $c$, which may be made to communicate with a suitable heater, intended to raise the temperature of the mash previous to its being introduced in the still A. The condensed water is drawn off from the cylinder C and jacket B through a pipe, $d$. The still A is charged with mash through a pipe, $e$, and the products of distillation escape through the helm E and neck $f$, and a pipe, $g$, which reaches two-thirds down the still, serves to draw off the low-wine by the pressure of the steam or vapors in the still itself. In order to prevent accidents, vacuum-valves $h$ $i$ are applied—one for the annular cylinder and steam-jacket and one for the still. The slop or spent mash is drawn off through the pipe $j$, which emanates from the bottom of the still. The several pipes are furnished with stop-cocks, so that they can be opened and closed at the pleasure of the operator. After the still has been charged about two-thirds full with mash, steam is admitted through the pipe $b$ into the annular cylinder and steam-jacket, and thereby the mash is inclosed between the heated sides of the steam-jacket and of the annular cylinder, and it is rapidly heated to the desired temperature. The distillation is thus effected with a small expenditure of steam, and the operator has complete control over his apparatus during the whole operation. He can readily raise or lower the temperature by increasing or decreasing the supply and the pressure of the steam, and the different products of the distillation can be easily separated from the residuum or slops.

I claim as new and desire to secure by Letters Patent—

The annular cylinder C, provided with steam-supply pipe $b$, and connecting through one or more pipes, $a$, with the steam-jacket B, in combination with the still A, pipes $e$ $g$, and helm E, constructed and operating substantially as and for the purpose set forth.

H. G. DAYTON.

Witnesses:
N. MARCHANT,
E. S. KNIGHT.